United States Patent [19]
Van Zanten et al.

[11] Patent Number: 6,164,152
[45] Date of Patent: Dec. 26, 2000

[54] COLUMN TILT ACTUATOR ASSEMBLY

[75] Inventors: David A. Van Zanten, Troy; J. Martin Nagle, Royal Oak; Michael J. Konn, Utica, all of Mich.

[73] Assignee: Nagle Industries, Inc., Clawson, Mich.

[21] Appl. No.: 09/307,931

[22] Filed: May 10, 1999

[51] Int. Cl.[7] ................................................. B62D 1/18
[52] U.S. Cl. ..................... 74/493; 74/501.6; 74/502.4; 74/506; 280/775
[58] Field of Search ............................... 74/493, 501.6, 74/502.4, 506; 280/775

[56] References Cited

U.S. PATENT DOCUMENTS

| 3,803,939 | 4/1974 | Schenten | 74/493 |
|---|---|---|---|
| 4,244,237 | 1/1981 | Sprunger | 74/493 |
| 4,554,843 | 11/1985 | Andersson | 74/493 |
| 5,507,521 | 4/1996 | Steffens, Jr. | 280/775 |
| 5,509,325 | 4/1996 | Thomas | 74/493 |
| 5,704,641 | 1/1998 | Shimizu et al. | 280/775 |
| 5,743,151 | 4/1998 | Khalifa et al. | 74/493 |
| 5,788,277 | 8/1998 | Hibino et al. | 280/775 |
| 5,802,926 | 9/1998 | Thomas | 74/493 |
| 5,823,062 | 10/1998 | Snell et al. | 74/493 |

FOREIGN PATENT DOCUMENTS 3409988  9/1985  Germany .

*Primary Examiner*—Allan D. Herrmann
*Attorney, Agent, or Firm*—Dinnin & Dunn, P.C.

[57] ABSTRACT

A column tilt actuator assembly for use on an automotive vehicle. The column tilt actuator assembly including a bracket member connected to a steering column. The column tilt actuator assembly further including a swing arm housing having a swing arm rotatably connected thereto. The swing arm housing and the swing arm are connected to the bracket with integrated fasteners. The swing arm also includes a swing arm knob for use in activating a tilt steering mechanism.

21 Claims, 3 Drawing Sheets

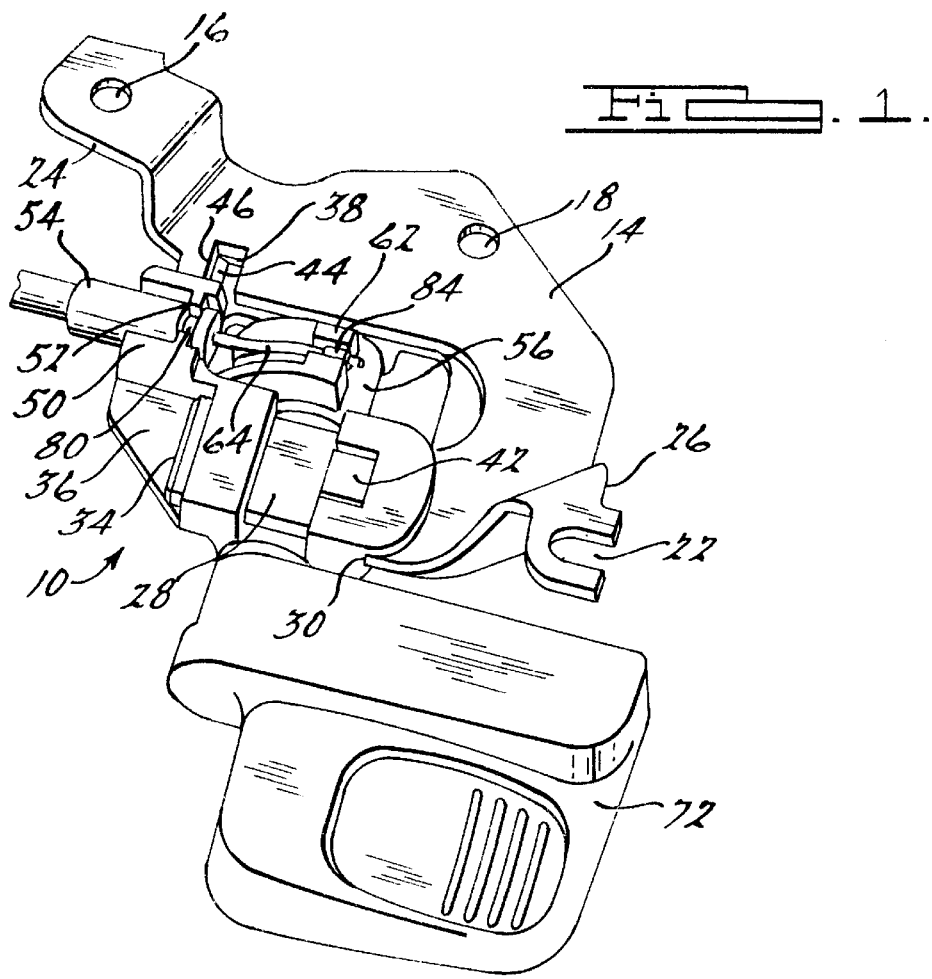
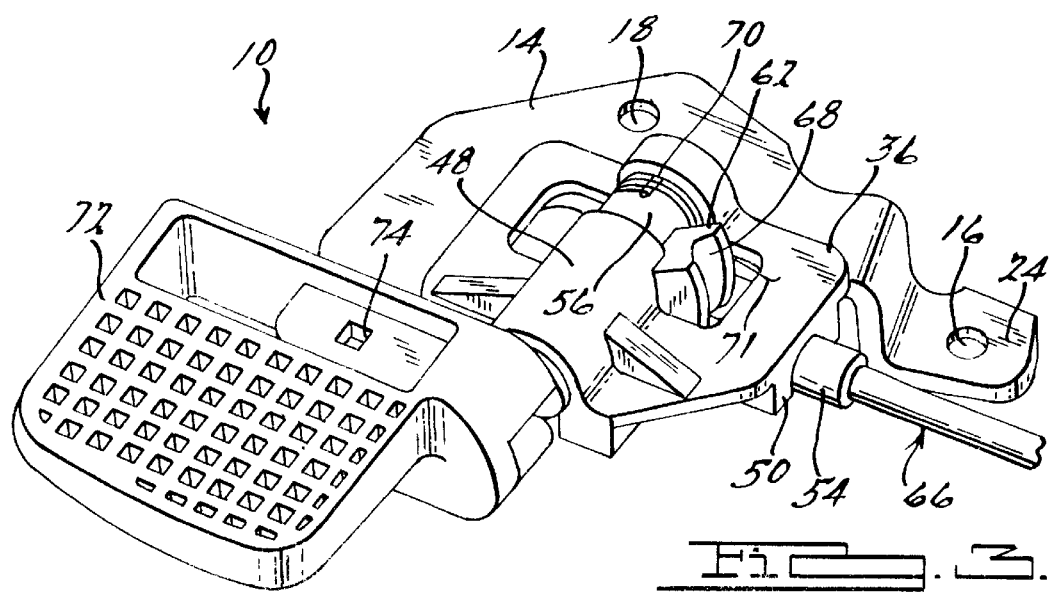

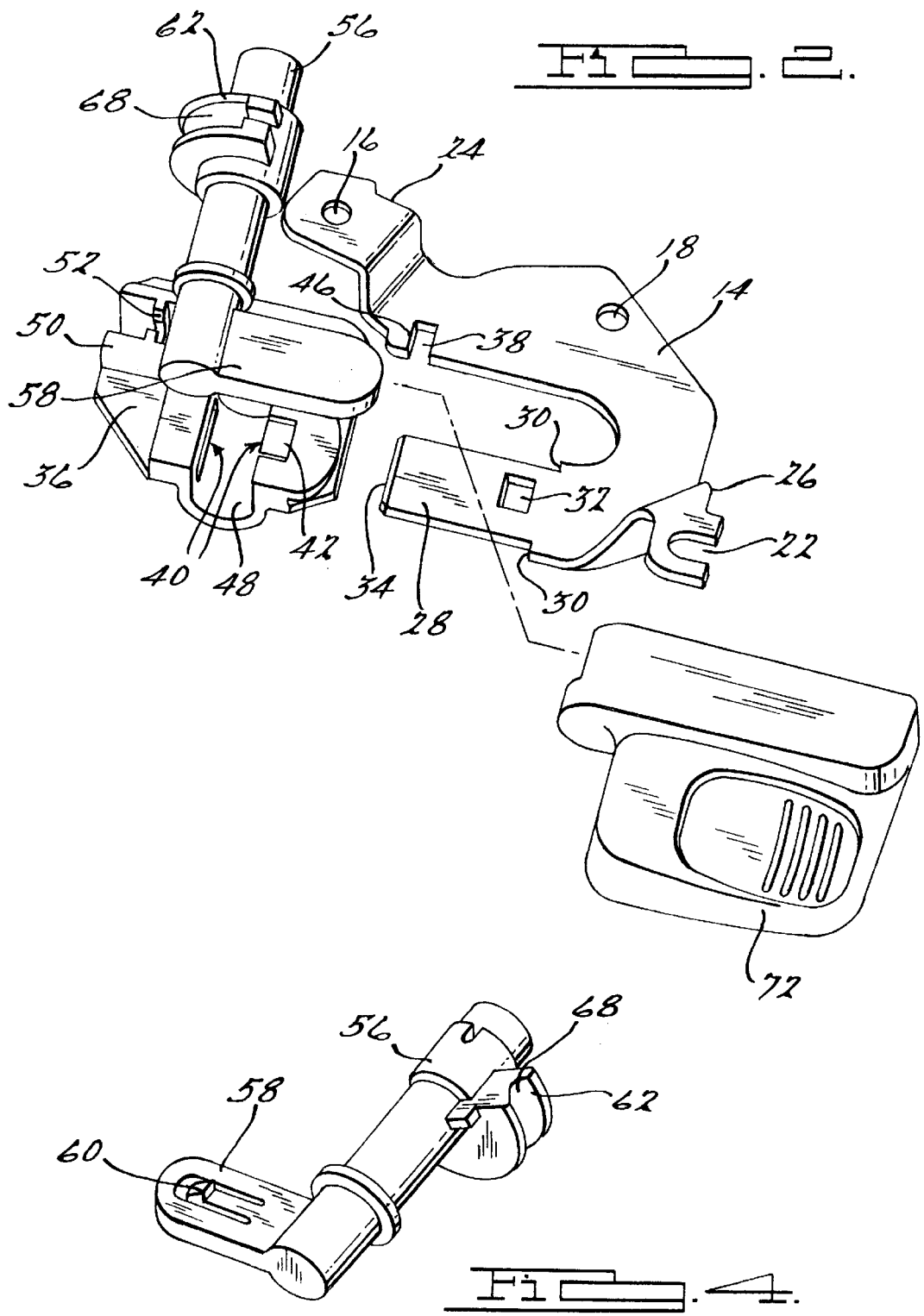

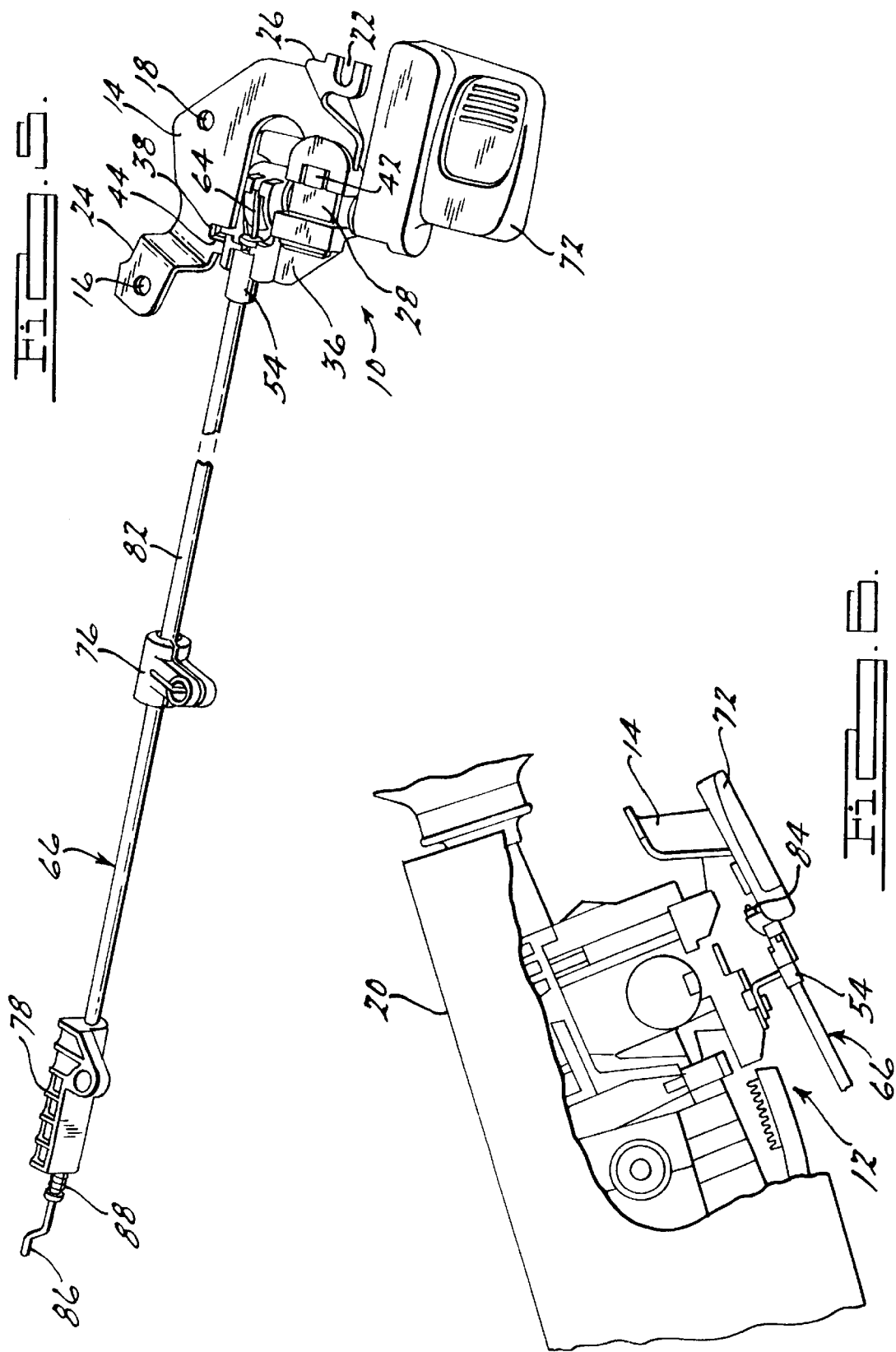

COLUMN TILT ACTUATOR ASSEMBLY

BACKGROUND OF THE INVENTION

1. Field of the Invention

The present invention relates to steering column tilt mechanisms, and more particularly relates to a column tilt actuator assembly having a swing arm mechanism.

2. Description of Related Art

The use of tilt steering columns in automotive vehicles has been known for many years. The tilt steering on the steering column will allow the operator of a vehicle to adjust the height and angle of the steering wheel to accommodate the operator's height, stature, seating position, and overall comfort. The steering wheel may also be placed in its uppermost tilt position to allow for easy entry and exit into the automotive vehicle.

Some steering columns currently in use do not have a positive locking mechanism to engage the tilt steering mechanism. Without a positive locking mechanism the tilt mechanism may be struck and activated during a collision sending the steering wheel into an unfavorable position, thus deploying the air bag at a position not favorable to the automotive vehicle operator. Such change in angle of deployment of the air bag can cause serious injury to the automotive vehicle operator.

Therefore, there is a need in the art for a positive locking tilt steering actuator assembly that will not be accidentally engaged by an operator's body or the dashboard of the automotive vehicle in a collision. Furthermore, there is a need in the art for a simple to manufacture and install column tilt actuator assembly that reduces the number of fasteners, screws and bolts to secure the assembly to the steering column.

SUMMARY OF THE INVENTION

One object of the present invention is to provide a column tilt actuator assembly.

Another object of the present invention is to provide a column tilt actuator assembly that is cable activated.

Yet a further object of the present invention is to provide a positive locking column tilt actuator assembly for use in an automotive vehicle.

Yet a further object of the present invention is to provide a column tilt actuator assembly that is easy to manufacture and assemble in the automotive vehicle.

Still a further object of the present invention is to provide a column tilt actuator assembly that uses reduced numbers of fasteners, screws, and bolts.

Yet a further object of the present invention is to provide a column tilt actuator assembly that uses rotary activation and then translates the rotary motion into linear activation to engage the tilt steering mechanism.

To achieve the foregoing objects the column tilt actuator assembly includes a swing arm housing rotatingly connected with a swing arm. The swing arm further includes a swing arm knob on one end thereof. The swing arm housing is securely attached to a bracket. The bracket is attached to the steering column. A cable assembly is attached to the swing arm on one end and to a tilt steering mechanism on the opposite end of the cable assembly.

One advantage of the present invention is that it provides a new column remote tilt actuator assembly that has a positive link to the column tilt mechanism.

Another advantage of the present invention is that it provides an easy to manufacture and assemble column tilt actuator assembly.

Still another advantage of the present invention is that it reduces the number of fasteners, screws, and bolts used to secure the column tilt actuator assembly to the steering wheel column.

Yet another advantage of the present invention is that it provides the use of a cable to activate the tilt mechanism in the steering column.

Still a further advantage of the present invention is that it takes rotary activation and translates that to a linear activation to operate a tilt steering mechanism.

Other objects, features and advantages of the present invention will become apparent from the subsequent description and appended claims, taken in conjunction with the accompanying drawings.

BRIEF DESCRIPTION OF THE DRAWINGS

FIG. 1 shows a top view of the present invention.

FIG. 2 shows an exploded view of the present invention.

FIG. 3 shows a bottom view of the present invention.

FIG. 4 shows a top view of the swing arm member.

FIG. 5 shows a column tilt actuator assembly and cable assembly.

FIG. 6 shows a perspective view of the column tilt actuator assembly in operation on a steering column.

BEST MODE OF CARRYING OUT THE INVENTION AND DESCRIPTION OF THE PREFERRED EMBODIMENT(S)

Referring to the drawings, the column tilt actuator assembly 10 is shown according to the present invention. The column tilt actuator assembly 10 is used to activate a tilt steering mechanism 12 such that the operator of an automobile can properly adjust the angle of the steering wheel with relation to the user's body. The column tilt actuator assembly 10 enables a positive locking condition with the column tilt system such that safety concerns with relation to the steering wheel tilting during an accident are removed.

As shown in FIGS. 1–3 a column tilt actuator assembly 10 includes a bracket 14 which is generally made of a metal material or any other hard ceramic or plastic material, but in the preferred embodiment the material is SAE 1080/1010 steel. The bracket 14 has a first orifice 16 and a second orifice 18 for connecting to the steering column assembly 20. The bracket 14 also includes a U-shaped notch 22 for connecting a shroud or cover over the outside of the column tilt actuator assembly 10. The bracket member 14 includes a first leg member 24 and a second leg member 26. The first leg member 24 includes the first orifice 16. The second leg member 26 includes the U-shaped notch 22. The bracket member 14 also includes a rectangular shaped finger member 28. The finger member 28 includes two shoulder portions 30. The finger member 28 also includes an orifice 32 therein which in the preferred embodiment has a rectangular shape. The finger member 28 also includes an angled surface 34 on end such that a swing arm housing 36 can easily slide on to the finger member 28 until it comes in contact with the first and second shoulder portions 30. The bracket member 14 also includes a notch 38 which acts as a locking surface for the swing arm housing 36.

The column tilt actuator assembly 10 includes a swing arm housing 36 which is generally made of a plastic material. In the preferred embodiment a 50% glass filled nylon is used. It should also be noted that any other type of plastic or composite material easily formed and manufactured may be used in lieu of the above mentioned preferred material. The swing arm housing 36 includes a locking channel 40 on one side thereof. The locking channel 40 includes a cantilever member 42 for use in fastening the swing arm housing 36 to the bracket 14. The swing arm housing 36 also includes a locking tooth 44 which engages with a locking surface 46 on the bracket to secure the swing arm housing 36 to the bracket 14. It should be noted that other types of fastening or fasteners may be used to secure the swing arm housing 36 to the bracket 14. The swing arm housing 36 also includes a circular channel 48 along its main body member having a solid end on one end thereof and an open end on the other. On the top surface of the swing arm housing 36 is located a tubular like groove 50 having an integrated locking clip 52 on one end thereof. The integrated locking clip 52 is used to secure a cable assembly connector 54 to the swing arm housing 36.

The column tilt actuator assembly 10 also includes a swing arm 56. The swing arm 56 is generally made of a plastic material but in the preferred embodiment is made of a 50% glass filled nylon. However, it should be noted that any other type of plastic material or composite that is capable of being manufactured and molded at a reasonable cost may be used. The swing arm 56 generally has a cylindrical shape that includes a paddle 58 on one end thereof. The paddle 58 has a locking tooth 60 located at a center portion of the paddle. At the opposite end of the swing arm 56 is a cam member 62. The cam member 62 is used to connect the cable 64 of the cable assembly 66 to the column tilt actuator assembly 10. The cam member 62 includes a channel member 68 in which the cable 64 travels when the cable 64 is taken up by rotary action of the swing arm 56. It should be noted that the cam profile can be adjusted for each specific actuator application such that the effort of the user to activate the affected mechanism may be adjusted per predetermined needs. The swing arm 56 also includes a slot 70 on the end adjacent to the cam member 62 such that a torsion spring 71 can be inserted in the slot 70. This will insure that the swing arm 56 will be positively returned back to its neutral position when released by the operator. The swing arm 56 also includes a swing arm knob 72 which is placed over the paddle 58 such that the locking surface 74 engages and interacts with the locking tooth 60 on the paddle 58 to form a secure connection of the swing arm knob 72 to the swing arm 56.

In operation the column tilt actuator assembly 10 is used in conjunction with a cable assembly 66. The cable assembly 66 includes a first connector 54, a second connector 76, and a third connector 78. The first connector 54 includes a slot 80 which is used to interengage with an integrated locking clip 52 on the swing arm housing. The first cable connector 54 is fastened to the outer cable cover 82 of the cable assembly 66. Within the cable assembly 66 is a metal cable 64 which includes a fastening member 84 on one end thereof. The fastening member 84 in the preferred embodiment is a swaged terminal which is connected to the end of the cable once it is passed through the orifice found in the cam member 62 of the swing arm 56. This connects the cable 64 directly to the cam member 62. The opposite end of the cable 64 includes a metal end connector member 86 and a spring 88 which is used to tension the cable. The third connector 78 is used to align the metal member end connector 86 such that the connector 86 can engage with the tilt mechanism on the steering column 20. The second connector member 76 is used to connect the mid cable portion of the cable 64 to the steering column 20. The column tilt actuator assembly 10 is located on the steering column 20 such that the operator of the vehicle can operate the tilt steering with one hand. This is accomplished by having the rotary action of the column tilt actuator swing arm 56 converted and translated into a linear activation of the tilt steer mechanism located on the steering column 20.

The use of the cable 64 in the column tilt actuator assembly 10 reduces the complexity of any operating levers in the tilt steering mechanism. It should further be noted that the use of the metal bracket 14, swing arm 56 and the swing arm housing 36 reduces the manufacturing and assembly cost. The swing arm housing 36 and the swing arm 56 are fastened to the bracket 14 without any external or secondary fasteners. The only fasteners needed to make the connection are integrated fasteners in the swing arm housing 36. The bracket member 14 mounts, supports, and aligns the swing arm housing 36 and the swing arm 56 onto the column of the steering wheel. When in operation the swing arm 56 will linearly move 12–15 mm of cable 64 through its rotational motion. Once the swing arm 56 is released it will allow the steering column to lock into a remote/positive lock position such that an impact or collision of the vehicle will not accidentally engage the tilt mechanism.

The present invention has been described in an illustrative manner, and it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A column tilt actuator assembly for use in an automotive vehicle, said column tilt actuator assembly including:
    a bracket;
    a swing arm, said swing arm having a cam member, said swing arm having a paddle;
    a swing arm housing connected to said bracket, said swing arm located in said swing arm housing such that said swing arm rotates within said swing arm housing; and
    a cable assembly having a cable and a first connector, said cable connected to said cam member of said swing arm.

2. The column tilt actuator assembly of claim 1 wherein said bracket member is a metal material, and said assembly is used in connection with a steering wheel tilt mechanism.

3. The column tilt actuator assembly of claim 1 wherein said swing arm is a plastic material.

4. The column tilt actuator assembly of claim 1 wherein said swing arm housing is a plastic material.

5. The column tilt actuator assembly of claim 1 further including a swing arm knob which is connected to said paddle.

6. The column tilt actuator assembly of claim 1 wherein said swing arm is returned to an initial position upon release of the swing arm knob.

7. A column tilt actuator assembly for use in an automotive vehicle, said column tilt actuator assembly including:
    a bracket;
    a swing arm, said swing arm having a cam member, said swing arm having a paddle; and
    a swing arm housing connected to said bracket, said swing arm located in said swing arm housing such that said swing arm rotates within said swing arm housing, said swing arm housing having a cantilever member and a locking tooth.

8. A column tilt actuator assembly for use in an automotive vehicle, said column tilt actuator assembly including:
   a bracket;
   a swing arm, said swing arm having a cam member, said swing arm having a paddle; and
   a swing arm housing connected to said bracket, said swing arm located in said swing arm housing such that said swing arm rotates within said swing arm housing, said swing arm housing is fastened to said bracket without any external fasteners.

9. A column tilt actuator assembly for use on a steering column in an automotive vehicle, the column tilt actuator assembly activates a tilt steering mechanism in the steering column such that an operator of a vehicle can adjust the tilt and position of the steering wheel with relation to the operator, said column tilt actuator assembly including:
   a bracket made of a metal or plastic material, said bracket including a first orifice and a second orifice, said first and second orifice are used to connect said bracket to the steering column, said bracket including a finger member;
   a swing arm made of a plastic material, said swing arm generally having a cylindrical shape, said swing arm including a cam member located on one end thereof, said swing arm having a paddle located on an end opposite of said cam member, said paddle including a locking tooth; and
   a swing arm housing made of a plastic material, said swing arm housing including a locking channel, said locking channel including a cantilever member, said swing arm housing including a locking tooth, said swing arm housing having a circular channel for locating and receiving said swing arm.

10. The column tilt actuator assembly of claim 9 further including a swing arm knob connected and secured to said paddle by said locking tooth.

11. The column tilt actuator assembly of claim 9 wherein said swing arm and said swing arm housing are secured and connected to said bracket by sliding said bracket finger member into said locking channel of said swing arm housing.

12. The column tilt actuator assembly of claim 10 wherein said cantilever member and said locking tooth of said swing arm housing interengage with locking surfaces on said bracket to form a secure connection to said bracket.

13. The column tilt actuator assembly of claim 9 further including a cable assembly connected to said swing arm cam member and the tilt steering mechanism.

14. The column tilt actuator assembly of claim 13 wherein said cable member includes a cable, said cable linearly moves 12–15 mm with a rotation of the said swing arm.

15. The column tilt actuator assembly of claim 9 wherein said swing arm includes a slot on one end thereof, said slot includes a torsion spring for returning said swing arm back to a positively locked and neutral position.

16. The column tilt actuator assembly of claim 14 wherein said rotary action of said swing arm is translated into a linear activation of the tilt steering mechanism via said cable.

17. The column tilt actuator assembly of claim 9 wherein said swing arm housing is connected to said bracket with integrated fasteners and without any external fasteners.

18. The column tilt actuator assembly of claim 9 wherein said cam member includes a predetermined cam profile, said cam profile adjusts the efforts and cable travel needed by an operator to activate the tilt steering mechanism.

19. The column tilt actuator assembly of claim 9 wherein said plastic material is a 50% glass-filled nylon.

20. The column tilt actuator assembly of claim 9 wherein said metal material is an SAE 1080/1010 steel.

21. A column tilt actuator assembly for use on a steering column in an automotive vehicle, the column tilt actuator assembly activates a tilt steering mechanism in the steering column such that an operator of a vehicle can adjust the tilt and position of the steering wheel with relation to the operator, said column tilt actuator assembly including:
   a bracket made of a metal material, said bracket including a first orifice and a second orifice, said first and second orifice are used to connect said bracket to the steering column, said bracket including a finger member;
   a swing arm made of a plastic material, said swing arm generally having a cylindrical shape, said swing arm including a cam member located on one end thereof, said swing arm having a paddle located on an end opposite of said cam member, said paddle including a locking tooth;
   a swing arm housing made of a plastic material, said swing arm housing including a locking channel, said locking channel including a cantilever member, said swing arm housing including a locking tooth, said swing arm housing having a circular channel for locating and receiving said swing arm; and
   a cable assembly connected to said swing arm and the tilt steering mechanism, said cable assembly including a cable, said cable connected to said cam member.

* * * * *